Sept. 1, 1964   D. E. HUTTENBACH ETAL   3,147,136
PROCESS FOR FORMING A GRIT-BLASTED AND METHYL
METHACRYLATE-EPOXY RESIN COATED GLASS SURFACE
Filed Jan. 11, 1961
FIG.1
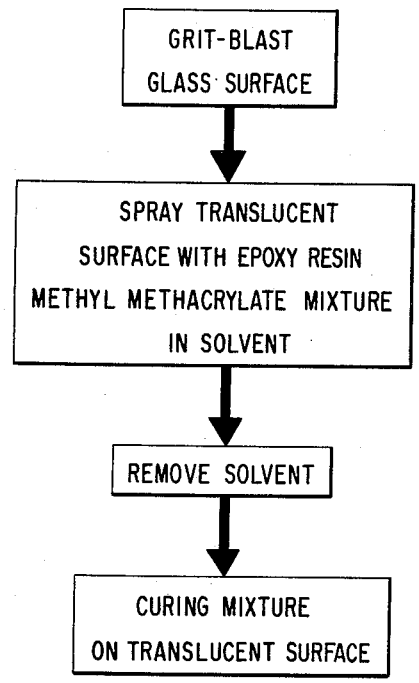
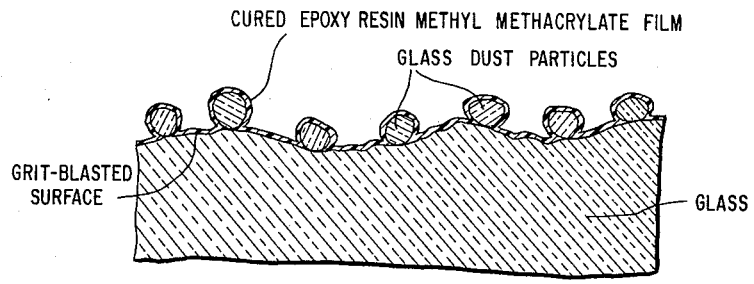
FIG. 2
INVENTORS
DIRK E. HUTTENBACH
EARL F. SCHAEFER
BY
ATTORNEYS 3,147,136
PROCESS FOR FORMING A GRIT-BLASTED AND METHYL METHACRYLATE - EPOXY RESIN COATED GLASS SURFACE
Dirk E. Huttenbach, Rochester, N.Y., and Earl F. Schaefer, Toledo, Ohio, assignors to Owens-Illinois Glass Company, a corporation of Ohio
Filed Jan. 11, 1961, Ser. No. 81,919
5 Claims. (Cl. 117—54)

This invention relates to the grit-blast process for producing translucent surfaces on smooth, clear glass and, more particularly, to a process for producing translucent surfaces which are free of readily removable glass dust particles normally produced during the grit-blast process.

It is well known to form translucent glass surfaces by the grit-blast process whereby clear, smooth-surfaced glass, such as glass sheets and articles, including bottles, glassware and the like, are carried on a conveyor through a pair of batteries of spray guns which bombard the surface of the glass with hard grit particles, such as 100-mesh aluminum oxide, at a pressure sufficient to form a mat surface, thus giving the glass surface the same appearance as if it were etched, due to the deflection of light through the rough, grit-blasted surface.

One disadvantage of the grit-blast process, and it is a serious disadvantage in the commercial production of translucent glass surfaces, is that the glass which is pulverized by the impact of the aluminum oxide particles on the glass surface, sticks to the surface of the glass by cohesion in the form of microscopic glass dust particles. When the glass surface is handled, or a finger is run over the surface, the powdered glass is removed as a white dust.

When containers such as bottles, jars, tumblers, etc., having one or more translucent surfaces, are made in accordance with known grit-blasting processes, it is important that there be as complete a removal of the glass dust particles as possible from the glass surface, for obvious reasons, particularly when the container is to be used for the bottling of food.

Another reason for making the glass surface free of glass dust particles is to prevent a health hazard wherein such particles may be inhaled or otherwise taken internally over a period of time by the personnel where the bottles and other containers are made and also where the bottles and other containers are subsequently filled.

Different ways for removing the glass dust particles from the surface of the treated glass include subjecting the surfaces to a rotary brushing operation or to blasts of air and/or to washing. However, these mechanical means never are able to completely eliminate the fine glass dust particles, although some reduction of the dust does occur.

Since it is impossible to grit-blast glassware without creating glass dust and this dust must be removed by a further operation which increases the handling of the glass and the consequent risk of breakage, the cost of producing the bottles is increased. Even when the grit-blasted bottles, jars, tumblers, etc., are washed in a conventional washer and then dried, runs and spots appear on the bottles, due mainly to uneven drying of the ware. Ultrasonic washing of the glassware involves the purchase of expensive equipment, and many of the bottles which have been thus treated still have runs and spots on the surface thereof.

When the grit-blasted bottles have been subjected to a combined brushing operation and blasts of air to clean the surfaces, it has not been possible to completely remove the glass dust, and complaints from customers are often received.

Accordingly, it is an object of the present invention to obviate the above disadvantages found with respect to the grit-blast processes for making a glass article having a translucent surface.

Another object of this invention is to produce a translucent surface on clear glass by grit-blasting, which surface is free of loosely adhering glass dust particles.

Another object of this invention is to form a glass container having at least one translucent surface formed by the grit-blasting process, but which is free of fine glass dust particles cohesively clinging thereto without materially increasing the cost of the container.

In attaining the objects of this invention, one feature resides in coating the grit-blasted glass surfaces having glass dust particles cohesively clinging thereto with a resin composition which resin has the property of being rapidly curable, preferably in a matter of seconds after it has been applied, into a very thin film, thus adhering the individual glass dust particles to the translucent glass surface, so that said particles are not removable, even after vigorous rubbing of the surface.

Another feature of the invention resides in coating the grit-blasted translucent glass surface with a resin composition which, when cured, forms a very thin film which does not detract from the appearance of the translucent surface.

Other objects, features, and advantages will be readily apparent from a further description of the invention and from the accompanying drawing wherein FIG. 1 is a flow diagram of the process of the invention; and FIG. 2 is an enlarged, cross-sectional view of the translucent glass surface having glass dust particles bonded thereto by the process of the invention.

It has been found that if a clear, smooth-surfaced glass container having at least one translucent surface produced by the usual grit-blasting operation and having glass dust particles cohesively clinging to the translucent surface is coated with a particular resin composition, preferably in a volatile solvent which has the property of volatilizing in a matter of a few seconds, and the resin has the property of being rapidly cured upon removal of the solvent to form a very thin film upon the translucent surface, the glass dust particles become securely bound to the translucent surface and vigorous rubbing of the surface with one's hand will not remove the glass dust. What is also important is that the translucent surface, treated in accordance with the invention, has the same appearance as that of a container which has been grit-blasted and the glass dust carefully removed by the usual cleaning methods. Furthermore, the labeling properties of the treated surface are in no way affected.

Among the resin compositions which have been found useful for the purpose of the present invention is included a mixture of unesterified epoxy resin and methyl methacrylate in a volatile solvent, with the mixture being present in an amount of from about 1.5 to 3.0% by weight of the solvent. While increased amounts of the resin may be present, the coating or film formed on the glass surface would be increasingly thicker and the appearance of the grit-blasted surface would be changed from a mat surface to a solid resin surface.

The methyl methacrylate resins commercially available include a solution of methyl methacrylate in 60% methyl ethyl ketone.

Examples of epoxy resins are those made by reacting one or more mols of epichlorhydrin or glycerol dichlorhydrin with 2 mols of bisphenol A in the presence of sodium hydroxide and at elevated temperatures of from about 50° to 150° C. The epoxy resins are represented by formula

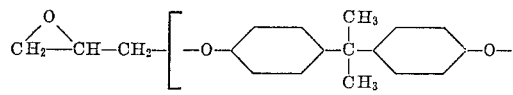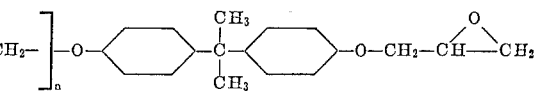

where $n$ is an integer of from 0 to 7 depending upon the relative proportions of bisphenol A and epichlorhydrin.

Among the known curing agents for the epoxy resins are included the functional amines, such as diethylenetriamine, triethylenetetramine, tetraethylenepentamine, diethylaminopropylamine, dibutylaminopropylamine, metaphenylenediamine, and the like. Dicyandiamide has also been used as an effective curing agent for epoxy resins. The curing agents are usually present in an amount of from about 2 to 6% by weight of the mixture of epoxy resin and methyl methacrylate, and preferably in the amount of 4%.

However, as is known to those in this art, amounts outside of these ranges would also give satisfactory results.

In the resin mixture, the methyl methacrylate is present with respect to the unesterified epoxy resin in a ratio of 25:75 to 97.3 by weight.

To more securely anchor the epoxy resin coating or film to the translucent glass surface and completely bond the glass dust to the surface, a silane primer may be included in the resin composition in an amount of from 0.5 to 5.0%, based on the amount of the epoxy resin-methyl methacrylate in the composition. Among the preferred silanes are the amino-substituted alkylalkoxy silanes including, for example, gamma-aminopropyltriethoxy silane and delta-aminobutylmethyldiethoxy silane.

The resin binder coating may be applied to the translucent surface of the bottle containing glass dust by any of the known methods. For example, a half-pint size bottle may be dipped in a resin solution, and it has been found that about 1.2 ml. of the resin-solvent solution is needed per bottle. Further, the half-pint size bottle may be coated by use of atomized air spraying whereby the amount of resin and solvent solution used is approximately 3 to 9 mls. per bottle. However, it has been found that the best results are obtained by hydraulic spraying with the range of from 25 to 40 p.s.i. At 30 p.s.i., approximately 2.7 ml. of resin per bottle is used.

For commercial production, the epoxy resin spraying operation is located right after the brushing operation and before the removal of the bottles from the conveyor belt where they have been grit-blasted.

The coating, rather than covering up and completely enveloping the dust, merely bonds the dust particles to the surface. Although each individual dust particle may be coated, it is not embedded in a resin coating.

In one embodiment of the invention, a number of clear, smooth glass bottles each had a surface grit-blasted with 100-mesh aluminum oxide particles and the mat or translucent surface which was formed had glass dust cohesively sticking thereto. Each surface was brushed in the usual manner and then was hydraulically sprayed at a pressure of 40 p.s.i. with a 1.8% solids mixture of equal amounts of an unesterified epoxy resin and methyl methacrylate. Since the emulsion is cloudy and a small amount of precipitate forms on standing, it is necessary to continuously agitate the composition to keep the ingredients in suspension. As soon as the bottles were spray-coated, they were subjected to circulating air and the acetone evaporated in 10 seconds, leaving a dry bottle having a clear, colorless, thin firm or coating and which, upon handling, did not form the usual white glass powder on the hands of the operator. Vigorous rubbing of the bottle failed to remove any glass dust. When the coated bottles were subjected to the circulating air at a temperature of about 120° F., the acetone evaporated and the resin film was cured in about 2 seconds.

The resin film on the translucent bottle surface, rather than covering up and completely enveloping the dust, merely bonds the dust particles to the surface. Although each individual dust particle may be coated, it is not embedded in a resin coating. The adherence of the resin to the glass is such that vigorous rubbing on the grit-blasted surface will not create any dust.

When the translucent surfaces of grit-blasted glass bottles, both treated in accordance with the invention and untreated, are viewed under a binocular microscope, individual dust particles can be distinguished on both treated and untreated surfaces. When a small brush is passed over each surface, dust particles will be observed to move on untreated surfaces whereas dust particles remain fixed on treated surfaces.

Determinations were also made on the total and diffused reflectance of grit-blasted bottles treated with various concentrations of the above resin composition within the range of 1.5% to 3% of solids and when compared to untreated grit-blasted bottles, they showed practically no difference.

Additional bottles made in accordance with the invention, wherein the epoxy resin-methyl methacrylate composition contained from 0.1 to 5% gamma-aminopropyltriethoxy silane, had the resin film firmly adhering to the translucent glass surface.

It has been found that when the epoxy resin-methyl methacrylate are present in the acetone composition in a range of from about 1.5 to 3%, the resulting cured film firmly bonds the glass dust particles to the translucent surface without affecting the appearance of the surface. When the solids content was 1.3%, some of the glass dust could be rubbed off. If appreciably more than 3% of the solids is used, the cured resin film on the translucent surface is thicker and the mat effect of the glass surface is destroyed.

Solids contents of 1.7%, 2.3%, and 2.8% within the aforesaid range gave excellent bonding of the glass dust particles to the translucent surface.

While acetone is the preferred solvent, other volatile solvents such as benzene, toluene, ethyl alcohol, methyl ethyl ketone, and the like, may be utilized. However, care must be taken that the particular solvent is one which will not affect the equipment utilized in the commercial production of the glassware—particularly rubber, rubber cement, and the like, which are susceptible to attack by benzene, toluene, and other solvents.

The following are examples of epoxy resin-methyl methacrylate compositions which, when diluted with acetone or another volatile solvent to a total solids content of from 1.5 to 3% by weight, can be applied to the translucent surfaces of a bottle which has been grit-blasted and will form a very thin film thereon, binding the glass dust particles to the surface without destroying the mat effect of the glass surface.

*Example I*

| | Percent |
|---|---|
| Epoxy resin | 12.2 |
| Methyl methacrylate resin | 12.2 |
| Diethylene triamine | 0.5 |
| Methyl ethyl ketone | 52.6 |
| Methyl isobutyl ketone | 22.5 |
| | 100.0 |

*Example II*

| | |
|---|---|
| Epoxy resin | 18.0 |
| Methyl methacrylate resin | 6.0 |
| Diethylene triamine | 0.7 |
| Methyl ethyl ketone | 36.5 |
| Methyl isobutyl ketone | 24.8 |
| Cellosolve acetate | 14.0 |
| | 100.0 |

Example III

| | Percent |
|---|---|
| Epoxy resin | 10.0 |
| Methyl methacrylate | 25.0 |
| Dicyandiamide | 0.4 |
| Gamma-aminopropyltriethoxy silane | 0.4 |
| Methyl ethyl ketone | 38.0 |
| Ethylene glycol monoethyl ether | 13.1 |
| Dimethyl formamide | 13.1 |
| | 100.0 |

From the above discussion of the invention, it will be apparent that other resins having the properties of being rapidly curable to thin, clear, colorless films or coatings which do not detract from the appearance of the translucent glass surfaces may be used to bond the microscopic glass dust particles to the glass surface. Among such resins may be included alkyd resins, acrylic-alkyd resins, epoxy resins, and the like.

Having fully described the invention, what is claimed is:

1. The process of making a clear, smooth glass surface translucent and free of loose, removable glass dust particles formed during said process comprising the steps of grit-blasting said clear, smooth glass surface into a translucent surface having the glass dust particles formed during the grit-blasting cohesively clinging to said translucent surface, spraying said translucent surface and particles with a composition comprising a mixture of an unesterified epoxy resin and methyl methacrylate in a volatile solvent, said mixture being present in an amount of from 1.5 to 3.0% by weight of said composition, said methyl methacrylate being present in a ratio of 25:75 to 97:3 by weight of said epoxy resin, removing said solvent and curing said mixture on said translucent glass surface, said cured mixture firmly bonding said glass dust particles onto said glass surface, said coated glass surface retaining its translucent appearance.

2. The process as defined in claim 1 wherein said volatile solvent is acetone.

3. The process as defined in claim 1 wherein said mixture is present in an amount of 1.8% by weight of said composition.

4. The process as defined in claim 1 wherein said mixture is present in an amount of 2.3% by weight of said composition.

5. The process as defined in claim 1 wherein said mixture is present in an amount of 2.8% by weight of said composition.

References Cited in the file of this patent

UNITED STATES PATENTS

| | | |
|---|---|---|
| 530,354 | Schlegel | Dec. 4, 1894 |
| 584,107 | Brown | June 8, 1897 |
| 1,518,807 | Minter | Dec. 9, 1924 |
| 1,536,749 | Austin | May 5, 1925 |
| 2,067,731 | Prochazka | Jan. 12, 1937 |
| 2,706,262 | Barnes | Apr. 12, 1955 |
| 2,819,245 | Shorr | Jan. 7, 1958 |
| 2,832,754 | Jex et al. | Apr. 29, 1958 |
| 2,931,739 | Marzocchi et al. | Apr. 5, 1960 |
| 2,951,772 | Marzocchi et al. | Sept. 6, 1960 |
| 2,954,358 | Hurwitz | Sept. 27, 1960 |
| 2,957,781 | Bailey et al. | Oct. 25, 1960 |

FOREIGN PATENTS

| | | |
|---|---|---|
| 17,427 | Great Britain | 1910 |
| 684,910 | Great Britain | Dec. 24, 1952 |
| 202,627 | Australia | July 20, 1956 |
| 70,780 | Denmark | Mar. 13, 1950 |

OTHER REFERENCES

Meals et al.: Silicones, Reinhold Publishing Corp., New York, 1959, p. 213.

De Dani: Glass Fibres, Chemistry and Industry, April 30, 1955, pp. 482–489.